Sept. 29, 1936.　　　　R. W. McLEAN　　　　2,055,630
METHOD OF AND APPARATUS FOR DISINTEGRATING FIBROUS MATERIAL
Filed Dec. 9, 1932　　　4 Sheets-Sheet 1

Fig. 1

Inventor
Robert W. McLean
by Roberts, Cushman & Woodbury
his Attorneys

Sept. 29, 1936.    R. W. McLEAN    2,055,630
METHOD OF AND APPARATUS FOR DISINTEGRATING FIBROUS MATERIAL
Filed Dec. 9, 1932    4 Sheets-Sheet 2

Sept. 29, 1936.  R. W. McLEAN  2,055,630
METHOD OF AND APPARATUS FOR DISINTEGRATING FIBROUS MATERIAL
Filed Dec. 9, 1932  4 Sheets-Sheet 4

Inventor
Robert W. McLean
by Roberts Cushman & Woodbury
Attys.

Patented Sept. 29, 1936

2,055,630

UNITED STATES PATENT OFFICE 2,055,630

METHOD OF AND APPARATUS FOR DISINTEGRATING FIBROUS MATERIAL

Robert W. McLean, Bridgewater, Mass., assignor to Carver Cotton Gin Company, East Bridgewater, Mass., a corporation of Massachusetts Application December 9, 1932, Serial No. 646,504

19 Claims. (Cl. 19—65)

This invention pertains to apparatus for and a method of disintegrating aggregates of discrete particles, particularly when such aggregates are bound or matted together by included or enveloping fibrous or lamellar elements. As an example of such aggregates of particles I shall hereinafter specifically refer to cotton-seed in the condition in which it is usually received at the oil mill and prior to delinting, and as illustrative of my novel apparatus I will describe a specific embodiment thereof particularly designed for the separation and cleaning of cotton-seed preparatory to delinting.

Present-day cotton gins have been so perfected that they are capable of removing most of the staple cotton from the seed in a relatively clean condition, even though the seed cotton as received at the gin contains a very high percentage of foreign material such, for example, as boll-trash, leaves, stalks, sand, pebbles, and other substances resulting from hasty or careless picking and handling. Substantially all of these foreign substances are rejected by the cotton gin, along with the seeds and, together with the seeds, are delivered to the oil mill. Often additional foreign substances find their way into the ginned seed before reaching the oil mill, such for instance as shreds or rags of burlap, strands of waste cotton fiber, string, pieces of wire, machine parts, such as nuts, bolts, and the like,—tools, lumps of coal or stone, shavings, splinters, pieces of board, etc. The fact that the seeds are covered with short fibers, coupled with the inclusion in the mass of leaf particles, rough-edged portions of the boll, dirty or waste staple cotton which has escaped the gin, and other binding material, tends to cause the mass to mat in coherent lumps which are not easy to separate.

In order that the delinting operation may be performed efficiently, it is desirable to remove the greater part of the foreign material from the seeds before subjecting the latter to the action of the linter gin. Cleaning devices commonly employed for the purpose include boll-reels, sand-reels, shakers, pneumatic cleaners, etc., all of which are fairly effective for the intended purposes so long as the material which they receive is not unduly matted or lumped, but none of these machines is capable of disintegrating badly matted or compacted lumps of seeds and fibrous binding material. Thus such matted aggregates are either rejected as waste by these preliminary cleaning machines, or are left substantially intact and are included with the other material which is delivered to the linter gin. Even more serious than this waste of the fiber or failure to separate the foreign material from the seed is the tendency of the long fibrous material which binds these masses together to catch in the cleaning apparatus which is employed, and gradually to clog such apparatus to such an extent as seriously to interfere with its operation and to necessitate frequent stoppage for cleaning.

With the object of avoiding the above difficulties I have devised the method and apparatus herein disclosed. In accordance with this method I subject the cotton-seed, prior to its treatment by the reels, shakers, etc., to a preliminary disintegrating action designed to loosen up the matted lumps and to deliver the cotton-seeds in the form of substantially separate or discrete particles, while, on the one hand, eliminating the larger and heavier pieces of foreign material such as stones and the like and, on the other hand, removing long fibrous particles or lamellar substances such as string, long cotton fiber, wire, large pieces of leaf, stem, boll, etc.

The preferred method and apparatus as hereinafter more fully described is based upon my discovery that if such matted fibrous material be subjected to the action of a plurality of sets of toothed or comb-like elements all of which move in the same general direction while in contact with the material and at a greater linear speed than that of the material, and in particular when alternate sets of such toothed elements move at substantially higher speeds than the other sets while the material is concomitantly subjected to vibration, the fibrous mass is loosened and opened up so thoroughly that included discrete particles, for example cotton-seed, sand, etc. will be permitted to escape from the mass. While I am not certain as to the exact reason for this very pronounced and improved action I apprehend that it may be due in part at least to the alternate pulling and slackening of the constituent fibers of the mass resulting from the above mode of operation.

Preferably the operation is so performed that as the large and heavy particles are loosened and separated from the mass they move in one direction, while the long fibrous material, as well as large and light lamellar elements travel in the opposite direction,—the seed which is separated during the operation escaping in still another direction (together with the finer foreign material such as sand). The separated seed, from which the binding substances have been largely removed, may now be treated in usual manner and by usual apparatus in a very effective way to remove the sand and other foreign particles of small size, but by reason of the thorough separation of the seed in accordance with my method, I contemplate that some of the usual cleaning operations and apparatus may be dispensed with.

While particularly useful and desirable for disintegrating masses of cotton-seed matted together with foreign material, I contemplate the utility of my invention to other substances, for example, coffee beans, seeds, etc., and also to instances in which the primary purpose is to loosen or open useful fiber and free it from foreign matter, for example, sand, and all such uses and utilities of my invention are to be understood as falling within the scope thereof as expressed in the appended claims.

In the accompanying drawings I have illustrated by way of example apparatus particularly designed for use in treating cotton-seed, and in the drawings,—

Fig. 2 is a fragmentary plan view, of diagrammatic character and with parts omitted illustrating one desirable arrangement of drive mechanism for the disintegrating or combing elements which I employ;

Referring to the drawings, the preferred apparatus preferably comprises a pair of base members 1 and 2 (Fig. 1) adapted to rest upon the floor or on any suitable support, said base members extending transversely across the entire width of the frame of the apparatus. The base member 1 is furnished with upstanding bearings at opposite sides of the machine, such bearings supporting horizontal shafts 3, one of which is shown at the lower left-hand part of Fig. 1.

Brackets 4 are pivoted to turn on these shafts 3, and these brackets are fixedly secured to the lower ends, respectively, of a pair of parallel rails 5 and 6 (Fig. 2). To each rail there is fixedly secured a depending leg member 8 (Fig. 1) which is rigidly fixed to the rail and braced by means of a member 9. The members 8 are united by a crossrail 10 and may also be braced and held in parallel relation by means of inclined brace rails 11. Each leg 8 is furnished with an opening for the reception of a bolt 12 which is adapted to pass through any selected one of a series of openings 13 in a corresponding extension member 14. Each extension member 14 is pivotally secured by means of a pivot pin 15 to a bracket carried by the base member 2. By adjusting the position of the bolt 12 with respect to the holes 13 of the extension 14, the angle of inclination to the horizontal of the side rails 5 and 6 may be adjusted at will.

The lower ends of the rails 5 and 6 support uprights 16 carrying devices for feeding the material to the disintegrating elements as hereinafter more fully described. Adjacent to the upper ends of the rails 5 and 6, brackets 17 and 18 are secured for supporting a conveyor device 19, while an elongate receptacle 20, preferably consisting of sheet metal, is attached to the rails 5 and 6 and so arranged as to catch any material which drops through the space between the rails. This receptacle 20 may be provided with any suitable door or other outlet, not shown, for the removal of material which collects therein. Preferably another receptacle 21 is disposed at the lower ends of the rails 5 and 6, and extends transversely across from one rail to the other.

Each rail supports a series of bearing boxes 22 (Fig. 4), each preferably independently removable and normally held in proper position by means of a bolt 23. These bearing boxes are provided with journals for the outer ends of a series of parallel shafts, alternate shafts being designated by the numerals 24 and 24a respectively. The shafts 24 project beyond the bearing boxes 22 carried by the rail 6 at the left-hand side of the machine, as viewed in Figs. 2 and 4, and on the outwardly projecting end of each shaft 24 is fixed a sprocket wheel 25. Likewise the shafts 24a extend outwardly beyond the bearing boxes carried by the rail 5, and the projecting end of each of these shafts is furnished with a sprocket wheel 26. The sprocket wheels 25 and 26 are all of substantially the same diameter and a chain 27 passes around the entire series of sprocket wheels 25, while a similar chain 28 passes around the entire series of sprocket wheels 26, the arrangement being such that all of the shafts turn in the same direction. If desired, chain tighteners, as indicated for example at 29 (Fig. 1), may be employed for keeping these chains 27 and 28 taut.

The legs 8 carry brackets supporting a transverse drive shaft 30 (Fig. 1) which projects outwardly on the left-hand side of the frame (Fig. 2) and carries a set of fast and loose pulleys 31 adapted to receive a belt (not shown) driven by any suitable source of power. Adjacent to this set of pulleys 31 is a pulley 32, and on the opposite side of the frame the shaft 30 carries a sprocket wheel 33. This sprocket wheel 33 drives a chain 34 passing around a sprocket wheel 35 on the shaft 24a next below the uppermost of the series of transverse shafts. At the other side of the frame a belt 36 transmits power from the pulley 32 to a pulley 37 on the uppermost shaft 24 of the series of transverse shafts.

In the arrangement herein disclosed the diameters of the pulleys 32 and 37 and of the sprocket wheels 33 and 35 are such that the speed ratio of shafts 24 and 24a is as 250 is to 96. However, it is to be understood, as hereinafter more fully described, that this ratio may be changed, if desired.

At the upper end of the frame comprising the rails 5 and 6 there is arranged a hopper-like chute 38 adapted to receive any material discharged at the upper end of the frame and to deliver it into a trough 39 supported by the brackets 17 and 18. In this trough turns a shaft 40 carrying a screw conveyor 41 adapted to move the material endwise in the trough and to discharge it at a desired point at one side of the apparatus. A sprocket 42 (Fig. 1) mounted on this shaft 40 is driven by means of sprocket chain 43 from the sprocket wheel 44 on the right-hand end of the uppermost of the shafts 24ᵃ.

At the lower end of the series of transverse shafts above described, an additional transverse shaft 24ᵉ (Fig. 2) is arranged, (more than one such additional shaft being provided if desired) such shaft having a sprocket wheel 26ᵉ (Fig. 2) of the same size as the sprocket wheels 26, and about which the chain 28 also passes. The shaft (or shafts) 24ᵉ thus turns at the same speed as the slower speed shafts 24ᵃ of the series. On the left-hand end of the shaft 24ᵉ there is fixed a pulley 45 driving a belt 46 (Fig. 1) which passes about a pulley on a shaft 47 journaled in the feed structure carried by the apparatus 16. This shaft carries a fluted roll 48 disposed in a hopper 49 in which the material to be operated upon is placed. Preferably one wall of this hopper is yieldingly mounted so as to permit escape of large lumps and to prevent jamming of the material. On the lowermost of the high speed shafts 24 there is fixed a pulley 50 which drives a belt 51 passing around a pulley on a shaft 51ᵃ carrying a beater device 52 which is adapted to loosen the material to some extent as it is delivered by the fluted roll 48. The material, after being acted on by the beater 52, drops onto an inclined guide apron 53 from whence it drops vertically down, substantially in the plane of the axis of the lowermost shaft 24ᵃ.

Each of the several transverse shafts carries a saw cylinder. Preferably that portion of each shaft which extends between the rails 5 and 6 is of relatively large diameter as compared with its ends, as shown at 54 (Fig. 4), such larger portion being provided with a longitudinal keyway, and on this enlarged portion is mounted a series of spacers 55 and intervening toothed saw disks 56. These spacers are of such thickness and diameter as to provide spaces 55ᵃ (Fig. 3) of appropriate size to permit the separated seeds or other discrete particles to drop freely through, but the size of these spaces may be varied in accordance with the character of the material to be treated. The saw cylinder thus provided may be constructed as described more in detail in my prior Patent No. 1,345,207, dated June 29, 1920, although the specific mode of constructing this toothed cylinder, or the specific character of the toothed members comprised in its construction, is not an essential feature of the present invention. As may be noted from inspection of Figs. 3 and 9, for example, the peripheral edges of the spaced disks constituting each cylinder may be regarded as collectively defining a cylindrical surface having an axially extending series of radial slots (the spaces between adjacent disks), the cylindrical surfaces, as thus defined, of adjacent cylinders intersecting in such a way as to produce an elongate surface on which the material to be treated rests, such elongate surface consisting of a series of upwardly convex cylindrical segments, thus forming a support consisting of alternating high and low portions.

Figures 3, 5, 5A, 6:
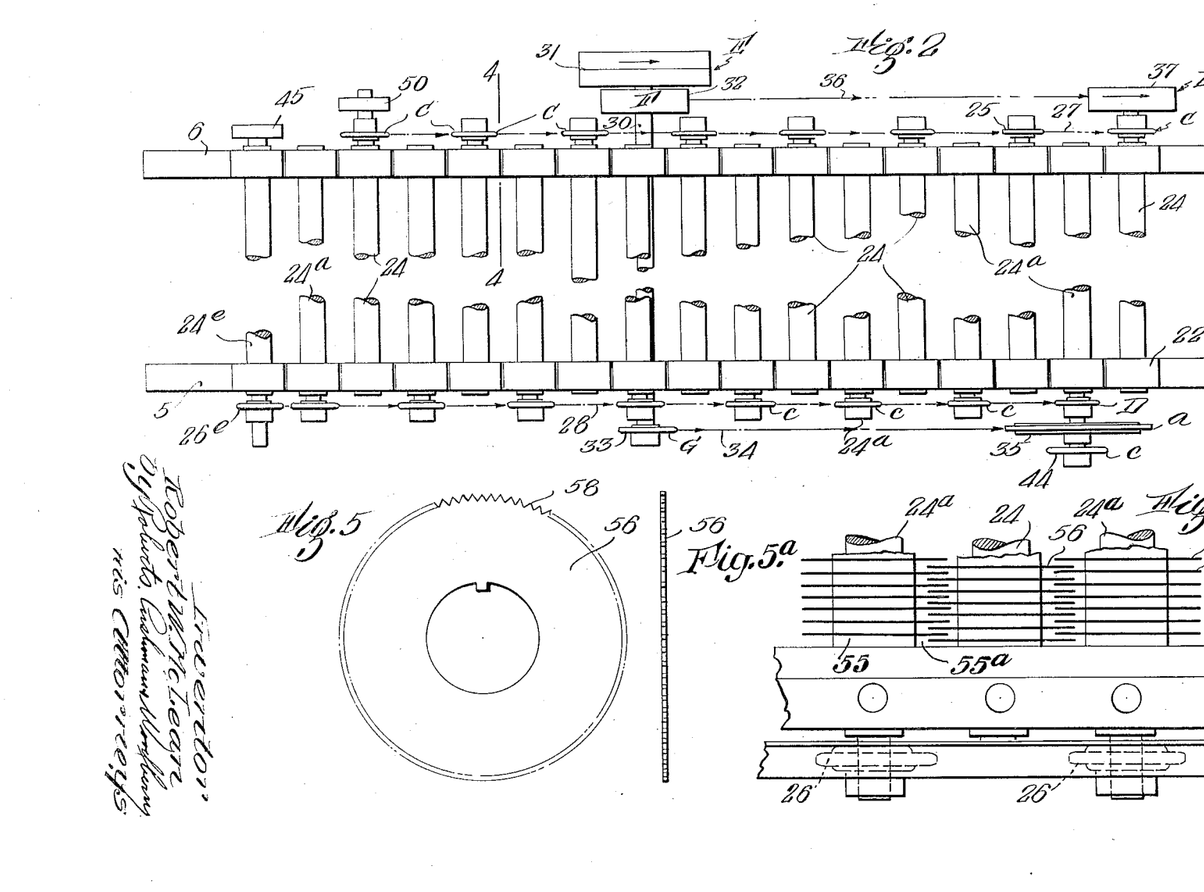
Fig. 3 is a fragmentary plan view, to large scale, showing the relative arrangement of successive saw cylinders constituting the preferred disintegrating elements.
Figs. 5 and 5a are a front and edge elevation, respectively, of one of the toothed saws of which the saw cylinders are composed.
Fig. 6 is a diagram illustrating a supposed mechanical principle involved in the operation of the apparatus.

Each of the saw disks 56 preferably is furnished with a toothed periphery, as shown in Fig. 5, and when using the relative speeds of the saw shafts, as above referred to, and with the series of cylinders disposed at substantially the inclination shown, I prefer to make the angles of these teeth of approximately 90°. However, this angle may be varied within wide limits in accordance with the ratio of speeds of the saw cylinders, the inclination of the frame, and the spacing of the cylinders, as will hereinafter be described. It is to be noted that the teeth of these disks do not necessarily lean in the direction of rotation, and are not sharpened for cutting, tearing or pulling as are the teeth of ginning saws, since the teeth of the cylinders employed in this apparatus are not intended to remove fiber from its attachments or to perform any ginning operation whatever. Preferably these teeth are symmetrical with respect to a radius passing through the apex of each tooth and the teeth are relatively blunt or furnished with a large apex angle. It may be noted that these teeth, measured from tip to root, are of relatively small height as compared with the radius of the peripheral path in which the tip of a tooth travels. For example, in the illustrated embodiments of the invention shown in Figs. 5 and 6 of the drawings the height of the teeth from root to tip is of the order 1/20 of the radius of the disk. These teeth thus perform two functions, to wit, they increase the frictional drag of the disks upon the material resting upon them so as to cause the material to move bodily along the series of cylinders in a somewhat more positive manner than though the disks were not toothed, although the teeth may be dispensed with under some conditions. The second function performed by these teeth is that of imparting to the material a very rapid vibration of short amplitude which is highly effective in causing seed or other discrete particles to sift down through the material and drop out between the disks, but this action is not to be confused with that of the arms of beaters, openers or similar fiber treating mechanisms which violently agitate the material and throw it about, and which would quickly jam if presented with material containing such elements as pieces of wire, woven fabric, rope or the like which are often included in the material which the present apparatus is designed to treat. Preferably, the saws used in the two lowermost cylinders have more and finer teeth than the saws of the other cylinders, both of these cylinders being low speed cylinders, as above noted. Obviously, the relative fineness and number of teeth in the different saw cylinders or groups of cylinders may be varied as desired.

In Fig. 6 I have attempted to show one mechanical principle which I believe to be involved in the operation of my apparatus. In this figure, the axes of a pair of adjacent saw cylinders are indicated at $C^1$ and $C^2$ respectively, and corresponding teeth of these cylinders are indicated at $T^1$ and $T^2$ respectively. In this diagram, the axes of the two cylinders are shown as lying in a plane P which is inclined at substantially 36° to the horizontal. As indicated in this figure, the cylinders are turning in the direction of the arrows, that is to say, both in a right-hand direction, and their peripheries intersect at the point X (the saws of alternate cylinders being staggered so that they do not interfere). Assuming equal peripheral speeds for the two cylinders, the action of the downgoing face 57 of the tooth T' is substantially less than the lifting action exerted by the upgoing face 58 of tooth $T^2$ as the teeth approach the point X. When, for example, the speed of the cylinder whose axis is at $C^1$ is of the order of 250 revolutions per minute, while that of the cylinder whose axis is at $C^2$ is 96 revolutions per minute,—the diameters of the saws being 5¾ inches and their axes being 5 inches apart, and when the angle between the inclined faces of each tooth of a cylinder is substantially 90°, it is found experimentally that the action upon the material of the upgoing face 58 of tooth T² effectively predominates over the action of the downgoing face 57 of the tooth T', so that the resultant action is to keep fibrous and stringy material, or large and hard lumps from becoming caught and jamming between the moving parts, the net result being that such fibrous and stringy or hard and lumpy material is caused to move bodily from one cylinder to the next, the cylinders thus acting as conveyor elements to urge the material constantly in the same general direction.

Thus in spite of the fact that the cylinder whose axis is at C¹ has a much greater peripheral velocity, there is no possibility that material, in passing from the high speed saw cylinder to the adjacent low speed cylinder will be caught and dragged down between the two cylinders.

So far as I am aware this action has never heretofore been recognized, or at least made use of in apparatus for treating fibrous material, but is highly advantageous in that it permits the employment of successive saw cylinders moving alternatively at high and low speeds without any possible danger of catching the material and causing it to clog up the apparatus or break or otherwise injure the rotating parts.

Figures 4, 6, 7, 8:
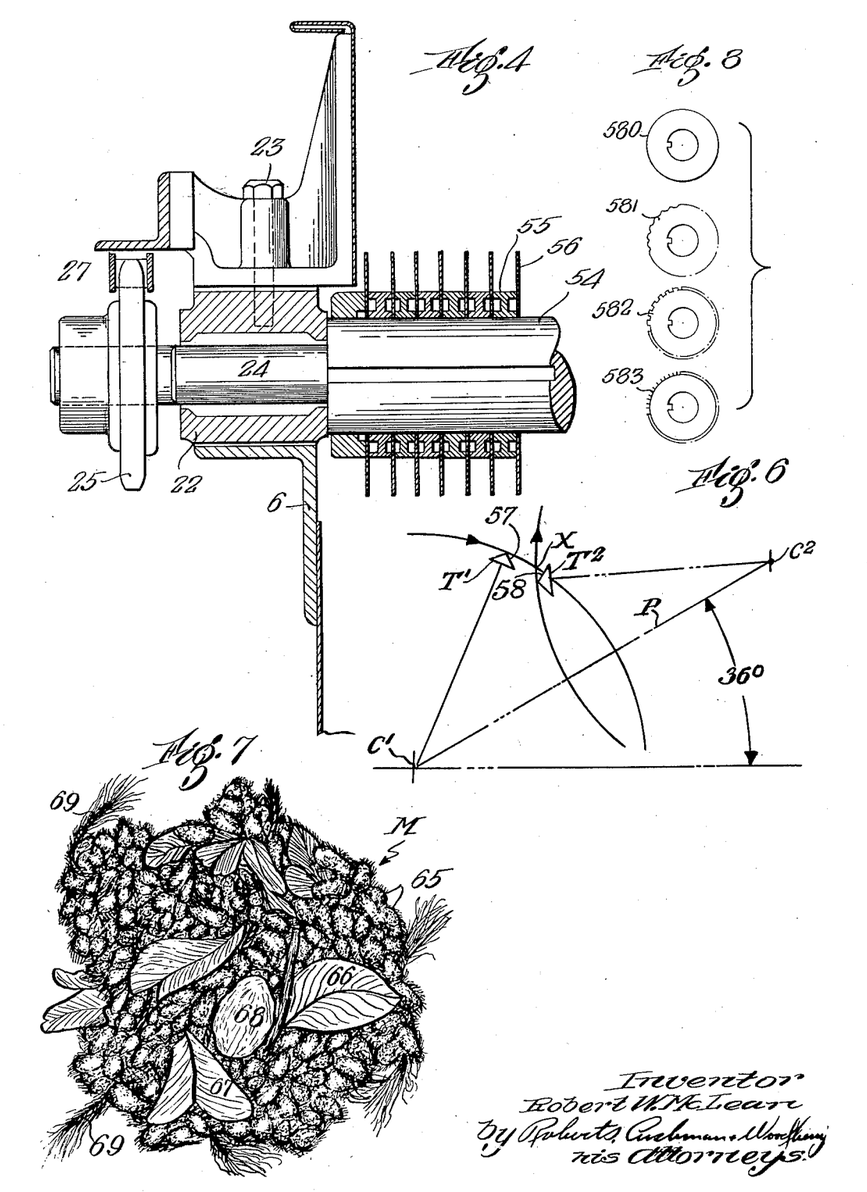
Fig. 4 is a fragmentary vertical section, to large scale, substantially on the line 4—4 of Fig. 2.
Fig. 7 is a perspective view illustrating such a matted mass of cotton-seed and foreign material as frequently occurs in the seed received at the oil mill.
Fig. 8 is a diagrammatic view, illustrating various types of saw disks which may be employed.

In Fig. 7 I have illustrated roughly the appearance of such a mass of commingled fibrous material and discrete particles as has been referred to. This mass M, for example, may comprise cotton-seeds 65 each having a coating of short fiber, together with pieces of stalk and leaf, indicated at 66,—portions of cotton boll 67, a stone 68 and intertwined strands of fibrous material such as twine or long cotton fiber, indicated at 69.

In the operation of the device, the material, which may be very much matted and which may contain fibrous and discrete particles in all varying ratios, is placed in the hopper 49 and is gradually fed down from the hopper onto the apron 53, whence it drops onto the lowermost saw cylinders. The two lowermost cylinders are driven at relatively low speed, as above described, and this speed is such, relatively to the angle of inclination of the frame, that heavy particles such as metal, stone or the like, falling on the lower cylinders, are pulled down by gravity in spite of the upward urge of the saws, and eventually drop from the lower cylinder into the receptacle 21. On the other hand, the lighter material, including the fibrous substances and such discrete particles as seed, sand, etc., as are commingled therewith, travels slowly up the series of saw cylinders under the urge of the toothed elements of these cylinders, all of which are moving in the same upward direction while in engagement with the material. Nevertheless, the inclination of the frame has a tendency to retard this upward movement, so that the toothed elements move much more rapidly in the upward direction than does the material. This results in a rapid repeated stroking or combing operation performed by the sets of saw teeth, such stroking operations being accompanied by blows as the teeth enter the material in a more or less upward direction so that the material is rapidly and violently vibrated during this combing operation.

By reason of the different speeds of alternate cylinders, I apprehend that while the material is supported, for example, between a slow moving and a fast moving cylinder, it tends to be pulled or drawn out due to the more rapid movement of the cylinder which is in advance, while, when the material is resting between two cylinders with the slow moving cylinder in advance, the material tends to pile up and to relax the tension to which it was previously subjected. Whatever the real action may be, I find as a result that the fibrous material is very rapidly disintegrated, loosened up, and pulled apart, and that such discrete particles as seeds, pebbles, sand, small pieces of leaf and the like fall through the spaces between the saws of the respective cylinders, dropping into the receptacle 20. On the other hand, the fibrous material tends to rest upon the peripheries of the saws, partly perhaps due to centrifugal action, and by reason of the frictional drag or combing action of the teeth it is gradually conveyed up the incline until it is discharged from the periphery of the uppermost of the cylinders into the hopper 38, from which it falls into the conveyor apparatus 19 which carries it off to a suitable point of discharge.

As above noted, the inclination of the frame may be varied in accordance with the desired retardation of the material which is required, this depending, to a large extent, upon the nature of the material and being determined by experience. Likewise the relative diameters of the saws; the fineness, number and angle of the saw teeth; the ratio of speeds of alternate cylinders; and the spacing of the saw cylinders may be varied, if desired, in accordance with circumstances. In fact, for some uses, the saws may be devoid of teeth, as shown, for example, at 580 (Fig. 8)—this constituting the ultimate lower limit of tooth size. On the other hand, the disks may have scalloped or slotted edges, as shown at 581 and 582, respectively (Fig. 8) or may have projecting pins at their edges, as shown at 583 (Fig. 8). All of these various arrangements may be considered as constituting special tooth shapes and will be found useful in dealing with certain classes of material. However, the ratio which I have above mentioned with the accompanying tooth angle I find extremely useful in dealing with cotton-seed for separating the latter from fibrous and heavy materials.

Figure 1:
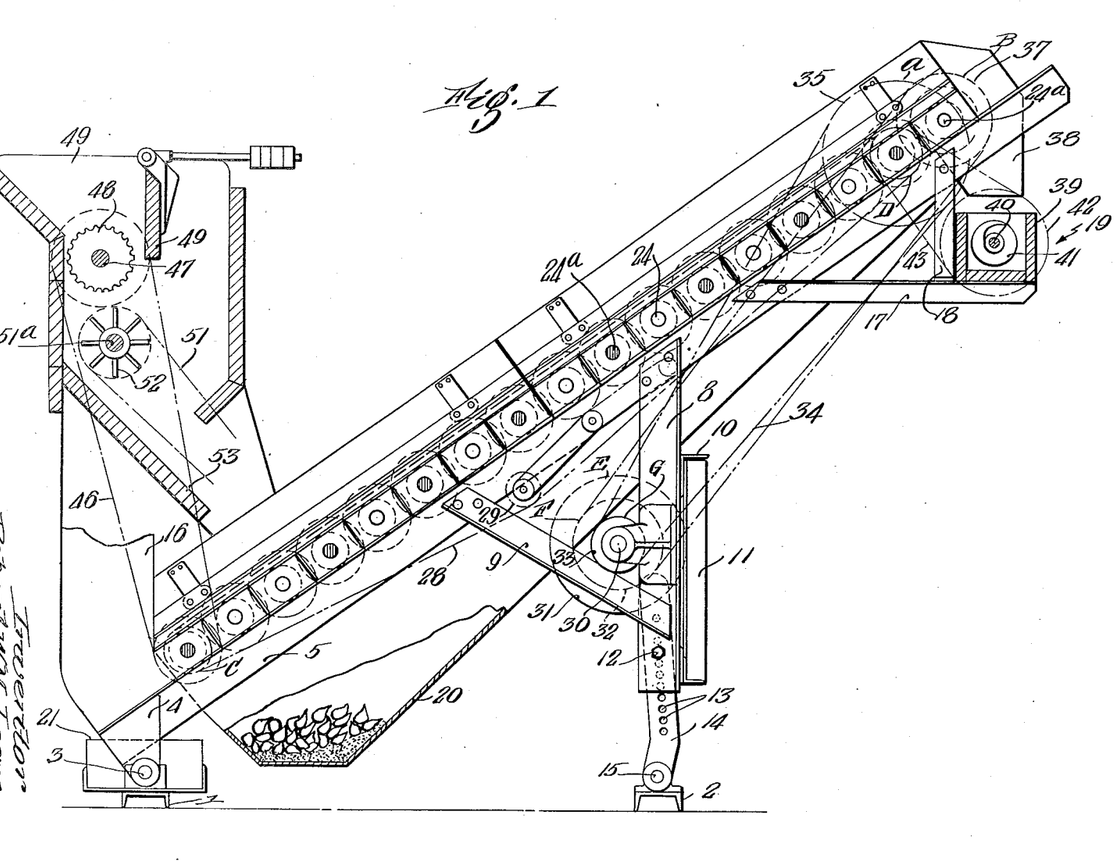
Fig. 1 is a side elevation of the apparatus, partly in vertical section.
Figure 9:
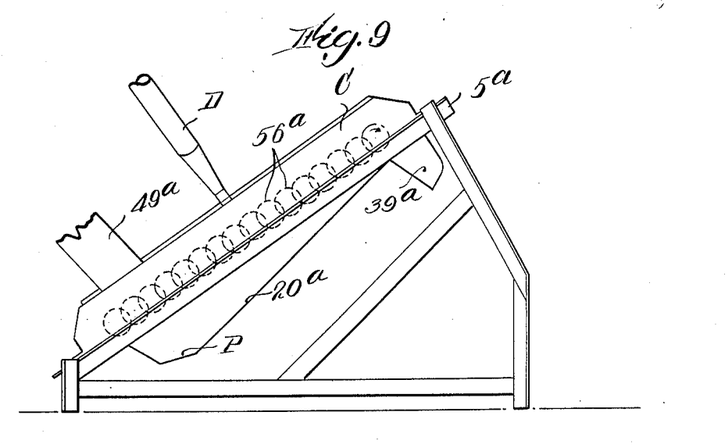
Figs. 9 and 10 are diagrammatic side elevations illustrating respectively certain modified types of apparatus.
Figure 10:
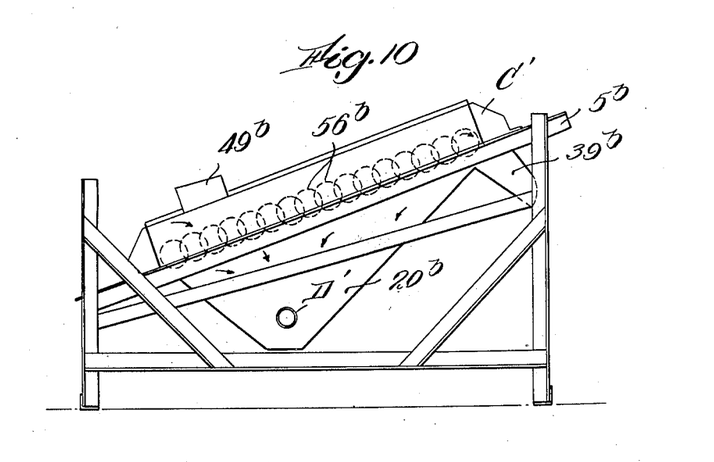

While I have found the apparatus particularly useful for this latter purpose, I contemplate that, as above suggested, it may be used for other purposes and, in fact, wherever fibrous material is to be loosened, disintegrated and separated from entrained particles, and while I have herein shown the apparatus as adapted for the gravity separation of such entrained particles, I contemplate that these discrete particles, after being loosened from the surrounding fiber, may be removed upwardly as, for example, by pneumatic action instead of falling downwardly by gravity, or that gravity action may be assisted by suction or otherwise. Pneumatically acting apparatus is illustrated by way of example in Figs. 9 and 10. In Fig. 9 the numeral 5ᵃ indicates one of a pair of parallel side rails similar to and having the function of the rails 5 and 6 of the device of Figs. 1 and 3, said rails supporting an inclined series of cylinders, each comprising spaced disks 56ᵃ disposed and driven similarly to the cylinders above described. A feed chute or hopper 49ᵃ, similar to the device 49 and its associated parts, as illustrated in Fig. 1, is arranged to deliver the material to be treated to the lower end of the series of cylinders. Near the upper end of the series, a housing 39ª encloses a conveyor similar to the conveyor 40 of Fig. 1. Below the series of cylinders is a receptacle 20ª similar to the receptacle 20 of Fig. 1. In the construction of Fig. 9 a casing C encloses the series of cylinders and a suction duct D leads from the upper part of this casing to any suitable point of discharge. An upward current of air is maintained in this duct by means of a fan blower or other suitable device (not shown). The lower end of the receptacle 20ª is open at P so that air may be drawn in and, after passing through the series of cylinders, may escape through the duct D, thus carrying away small and light particles such as dust and lint. As shown in Fig. 10, the device may be arranged for pneumatic separation of loose particles by movement in a downward direction. Thus the inclined rail 5ᵇ and a parallel rail (not shown) support a series of saw cylinders comprising spaced disks 56ᵇ. A feed hopper 49ᵇ receives the material to be treated and delivers it to the lower end of the series of cylinders. At the upper end of the series a conveyor in a housing 39ᵇ carries away material which does not drop between the disks. An airtight receptacle 20ᵇ below the series of cylinders receives particles which drop between the disks,—the series of cylinders being enclosed in a casing C'. A suction duct or ducts D' leads from the receptacle 20ᵇ to a suitable point of discharge, an outward flow of air through such duct or ducts being maintained by appropriate means. In this arrangement the gravity separation of particles from the fibrous mass is assisted by the downward current of air passing between the disks. I further contemplate that the sizes, relative arrangement of parts, and speed of operation may be varied from that herein specifically disclosed without departing from the spirit of the invention.

I claim:

1. That method of treating masses of discrete particles commingled with fibrous material so as to separate the discrete particles from the remainder of the mass, said method comprising as steps subjecting the mass to the successive action of a series of sets of non-cutting tooth elements, the elements of each set being spaced sufficiently to permit separated discrete particles to pass freely between them, so actuating the several sets of tooth elements as to tend to move the mass continuously and bodily in a predetermined direction while concomitantly subjecting the material to vibration of small amplitude, the elements of alternate sets moving at a greater velocity than those of intervening sets, and retarding the movement of the mass in said predetermined direction solely by the action of gravity.

2. Apparatus for treating masses of fibrous material having commingled therewith discrete particles whereby to separate the discrete particles from the remainder of the mass, said apparatus comprising a series of rotary sets of non-cutting tooth elements, each of relatively small height from tip to root as compared with the radius of the path of travel of the tip, the elements of each set being spaced apart and the elements of adjacent sets being staggered, means supporting the series in inclined position, means to deliver the material to the lower end of the series, and means operative to move alternate sets of tooth elements at one predetermined speed and to move intervening sets at a different predetermined speed, respectively, but all in a direction tending to move the material upwardly along the series, the inclination of the series being such that movement of the material upwardly is substantially retarded by gravity.

3. Apparatus for treating masses of fibrous material having commingled therewith discrete particles whereby to separate the discrete particles from the remainder of the mass, said apparatus comprising a series of rotary cylinders each having a set of disks, the peripheries of the disks being of non-cutting character, the disks of each cylinder being spaced to permit free passage of separated discrete particles between them and being staggered with respect to the disks of adjacent cylinders, the axes of the several cylinders being parallel and disposed in an inclined plane, means for feeding material to the cylinders, and means turning all of the cylinders in the same direction, alternate cylinders turning at greater speed than those intervening.

4. Apparatus for treating masses of fibrous material having commingled therewith discrete particles whereby to separate the discrete particles from the remainder of the mass, said apparatus comprising an inclined support carrying series of spaced bearings, a series of parallel saw cylinder shafts mounted to turn in said bearings, each shaft carrying a cylinder comprising a series of spaced peripherally toothed saw blades, means for depositing material upon a cylinder at the lower end of the series, means for turning all of the cylinders in the same direction and so as to tend to carry the material upwardly along the series, the driving means being arranged to turn alternate cylinders at an angular velocity relatively higher than that of the intervening cylinders, the angles of the saw teeth being so chosen with reference to the relative peripheral velocities of the saws that when the downwardly moving forward edge of the tooth of a rapidly moving saw approaches the upward moving forward edge of a corresponding tooth of a slow moving saw, said forward edge of the latter saw has a vertical upward component of velocity at least as great as the vertical downward component of velocity of the forward edge of the tooth of the rapidly moving saw.

5. Apparatus for treating masses of fibrous material having commingled therewith discrete particles whereby to separate the discrete particles from the remainder of the mass, said apparatus comprising a series of saw cylinders each comprising a series of spaced saws, the axes of the cylinders being so spaced that the peripheries of adjacent cylinders intersect, means for turning each of the cylinders in the same direction while alternate saws rotate at a higher angular velocity than intervening saws, each saw having peripheral teeth, the angles of the teeth being so chosen with reference to the relative peripheral velocities of the cylinders that at the points of intersection of the peripheries of adjacent cylinders the vertical upward component of velocity of the upgoing face of a tooth of the low velocity cylinder is at least as great as the vertical down component of velocity of the downgoing face of a tooth of the high velocity cylinder.

6. Apparatus for treating masses of fibrous material having commingled therewith discrete particles whereby to separate the discrete particles from the remainder of the mass, said apparatus comprising an inclined series of saw cylinders each having a series of spaced saws, the inclination of the saws being substantially 36° to the horizontal, the saws of adjacent cylinders being staggered, and means for driving alternate cylinders at one speed, and intervening cylinders at a different speed, said driving means being so constructed and arranged that the peripheral speeds of adjacent cylinders are in a ratio of the order of 250 to 96, the angles of the saw teeth being at least 60°, the spacing of the saws and the shapes of their teeth being such that the fibrous material is moved bodily in a substantially tangential direction from one end to the other of the series of cylinders while discrete particles are permitted to drop freely between adjacent saws of each cylinder.

7. Apparatus for treating masses of fibrous material having commingled therewith discrete particles whereby to separate the discrete particles from the remainder of the mass, said apparatus comprising an elongate inclined frame, means for adjusting the angle of inclination of the frame, series of bearings carried by the frame, parallel shafts mounted in the bearings, driving means at one side of the frame operative to drive alternate shafts at a predetermined speed, driving means at the opposite side of the frame operative to drive intervening shafts at a different speed but in the same direction, a saw cylinder mounted on each shaft, each cylinder having spaced saws, each saw having non-cutting teeth on its edge, the saws of adjacent cylinders being staggered, means operative to deposit material upon one of the slower moving cylinders at the lower end of the series, means operative to receive separated particles dropping downwardly between the saws, and means operative to receive material delivered by the cylinders at the upper end of the series.

8. Apparatus for treating masses of fibrous material having commingled therewith discrete particles whereby to separate the discrete particles from the remainder of the material, said apparatus comprising a series of saw cylinders each having spaced peripherally toothed saws, the axes of the several cylinders being parallel and disposed in an inclined plane, the saws of adjacent cylinders being staggered and the peripheries of adjacent cylinders intersecting, means operative to turn the several saw cylinders all in the same direction but so that alternate cylinders turn at a higher speed than intervening cylinders, the spacing of the cylinders,—the relative speeds of rotation,—and the angles of the teeth of the saws being such that fibrous material passing from a fast moving saw to a slow moving saw will be upwardly ejected from between them.

9. Apparatus for treating masses of fibrous material having commingled therewith discrete particles whereby to separate the discrete particles from the remainder of the mass, said apparatus comprising an upwardly inclined series of toothed cylinders having their axes parallel and so spaced that the peripheries of the cylinders intersect, the teeth being of non-cutting character, the teeth of adjacent cylinders being staggered so as not to interfere with each other, means for turning the cylinders all in the same direction but so that alternate cylinders throughout the major part of the series at least turn at one and the same speed, while intervening cylinders all turn at a different and predetermined higher speed, the parts being so constructed and arranged that fibrous material resting upon the series of cylinders will be advanced bodily in an upward direction along the series while being subjected to vibratory movement of small amplitude but will not be drawn between adjacent cylinders in passing from a high speed cylinder to a low speed cylinder.

10. Apparatus for treating masses of fibrous material having commingled therewith discrete particles whereby to separate the discrete particles from the remainder of the mass, said apparatus comprising a series of sets of rotating disks, the disks of each set being spaced sufficiently to permit separated discrete particles to pass freely between them, but being close enough to support the fibrous material upon their peripheral edges, the disks of the several sets being interposed between the disks of adjacent sets, the peripheries of said disks being scalloped to provide non-cutting arcuate teeth, and means for turning the several sets of disks all in the same direction, alternate sets turning at one predetermined velocity and intervening sets turning at another predetermined velocity.

11. Apparatus for treating masses of fibrous material having commingled therewith discrete particles whereby to separate the discrete particles from the remainder of the mass, said apparatus comprising a group of spaced sets of non-cutting tooth elements, each set having its tooth elements disposed in parallel series, the several series of each set being so spaced apart as to permit passage of the discrete particles between them, a second group of spaced sets of non-cutting tooth elements, each of said latter sets also having its tooth elements disposed to form parallel spaced series, means supporting both groups in such a way that sets of tooth elements belonging to one group alternate with sets belonging to the other group, the series of tooth elements in any given set being disposed between the series of tooth elements of the next adjacent set, means for delivering the material to be treated to the endmost set of one group, and means operative to move the tooth elements of the sets of one group at a greater linear velocity than the tooth elements of the sets of the other group, but all in such a direction as to tend to move the material bodily from one set of tooth elements to another along both groups.

12. Apparatus for treating masses of fibrous material having commingled therewith discrete particles whereby to separate the discrete particles from the remainder of the mass, said apparatus comprising a group of sets of rotary disks, each disk having non-cutting teeth, the disks of each set being spaced sufficiently to permit passage of the separated particles between them, means for turning said disks in a predetermined direction, another group of sets of rotary disks, each of the latter disks also having non-cutting teeth, the sets of one group alternating with those of the other, the teeth of the several disks being of a tip to root height of the order of 1/20 of the radii of the respective disks, and means for turning the sets of disks of the second group in the same direction as the sets of the first group but at a different peripheral velocity, the axes of the several sets being substantially parallel but disposed in an inclined plane.

13. Apparatus for treating masses of fibrous material having commingled therewith discrete particles thereby to separate the discrete particles from the remainder of the mass, said apparatus comprising a series of sets of non-cutting tooth elements, the elements of each set being spaced apart and the teeth of each set being aligned with the spaces between the teeth of adjacent sets, means supporting the series in inclined position, means for delivering the material to be treated to the lower end of said series, and means operative to move the tooth elements of alternate sets at one predetermined velocity and the tooth elements of intervening sets at a different velocity but all in a direction such as to tend to move the material upwardly along the series, the material being substantially unimpeded in its upward movement except by gravity.

14. Apparatus for treating masses of fibrous material having commingled therewith discrete particles thereby to separate the discrete particles from the remainder of the mass, said apparatus comprising a series of sets of non-cutting tooth elements, said series being inclined at a substantial angle to the horizontal,—elements of each set being spaced and being staggered with respect to the elements of adjacent sets, means operative to move the lowermost sets of elements at a relatively low speed, means operative to move alternate sets further up in the series at a predetermined higher speed and intervening sets at said low speed, the inclination of the series and the speed of said lower sets of elements being such that heavy particles falling upon said lower sets of elements will move by gravity in a downward direction along the series while relatively lighter fibrous material will move upwardly along the series.

15. Apparatus for treating masses of fibrous material having commingled therewith discrete particles thereby to separate the discrete particles from the remainder of the mass, said apparatus comprising a series of sets of non-cutting tooth elements, said series being arranged in an inclined plane, means operative to move all of the elements in a direction tending to move material resting upon said elements upwardly along the series, the peripheral velocity of a predetermined number of the lowermost sets being relatively low so that heavy material delivered thereto moves downwardly along the series under the action of gravity, the speed of certain more elevated sets of elements being so much greater that light and fibrous material is moved upwardly thereby along the series, alternate ones of said more elevated sets turning at one peripheral velocity and intervening ones of said more elevated sets turning at a different peripheral velocity, the upward movement of the material along the series of sets being substantially unimpeded except by gravity, conveyor means arranged adjacent to the lower end of the series to receive and convey away heavy material delivered at such lower end, conveyor means arranged near the upper end of the series to receive and take away the light and fibrous material delivered at such upper end, and means below the series of toothed elements for receiving separated discrete particles which drop down between said elements.

16. Apparatus for treating masses of fibrous material having commingled therewith discrete particles thereby to separate the discrete particles from the remainder of the mass, said apparatus comprising a series of rotating peripherally toothed cylinders all turning in the same direction but with alternate cylinders turning at a higher angular velocity than intervening cylinders, means for depositing material upon cylinders at that end of the series away from which the upper peripheral portions of the cylinders are turning, the series of cylinders being upwardly inclined so that gravity tends to prevent movement of the material at the same linear speed as the cylinders whereby the latter exert a disintegrating action upon the material, the cylinder teeth being non-cutting and so designed with reference to the cylinder speed and spacing as to prevent the material from being caught between downgoing and upgoing teeth of adjacent cylinders.

17. Apparatus for treating masses of fibrous material having commingled therewith discrete particles thereby to separate the discrete particles from the remainder of the mass, said apparatus comprising a series of saw cylinders each having spaced peripherally toothed saws, saws of adjacent cylinders being staggered, means operative to turn the series of cylinders all in the same direction, alternate cylinders turning at higher angular velocities than intervening cylinders, an additional cylinder at one end of said series, said latter cylinder comprising saws having finer teeth than those of the other cylinder and turning at a velocity lower than that of those cylinders of the first-named series which turn at the higher speed but in the same direction as the cylinders of said series, means for feeding material to said low speed cylinder at the end of the series, the direction of rotation of all of the cylinders being such as to tend to move the material away from the feed point, the series being upwardly inclined from the feed point so that gravity tends to retard advance of the material by the cylinders so that the saw teeth disintegrate the material as the latter advances lengthwise of the series.

18. Apparatus for treating masses of fibrous material having commingled therewith discrete particles thereby to separate the discrete particles from the remainder of the mass, said apparatus including means for advancing material upwardly along a predetermined path against the downward pull of gravity, said means comprising a plurality of sets of endless series of non-cutting tooth elements, said sets being spaced along said path, and means for moving said elements all in an upward direction while in contact with the material, said elements being constructed and arranged to permit free dropping of separated discrete particles while preventing downward movement of matted fibrous material, and means for moving the tooth elements of alternating sets at a predetermined velocity different from that of intervening sets, said tooth elements being so short from root to tip as substantially to prevent catching of fibrous material between the teeth of adjacent sets as the material moves from one set to the next.

19. Apparatus for treating masses of fibrous material having commingled therewith discrete particles whereby to separate the discrete particles from the remainder of the mass, said apparatus comprising a series of sets of rotating disks, the disks of each set being spaced sufficiently to permit separated discrete particles to pass freely between them but being close enough to support the fibrous material upon their peripheral edges, the disks of the several sets being interposed between disks of adjacent sets, the peripheries of the disks being toothed, the salient angles of the teeth being at least 90°, means for turning said sets of disks all in the same direction, the alternate and intervening sets having a velocity ratio of substantially 250:96, and means for depositing material to be treated upon the peripheral edges of the disks adjacent to one end of the series of sets.

ROBERT W. McLEAN.